3,077,781
MEASURING AND BALANCING SYSTEMS FOR HIGH-SPEED MACHINES
Saul H. Silver, Washington, D.C., assignor to American Machine & Foundry Company, a corporation of New Jersey
Filed Apr. 4, 1958, Ser. No. 726,379
10 Claims. (Cl. 73—465)

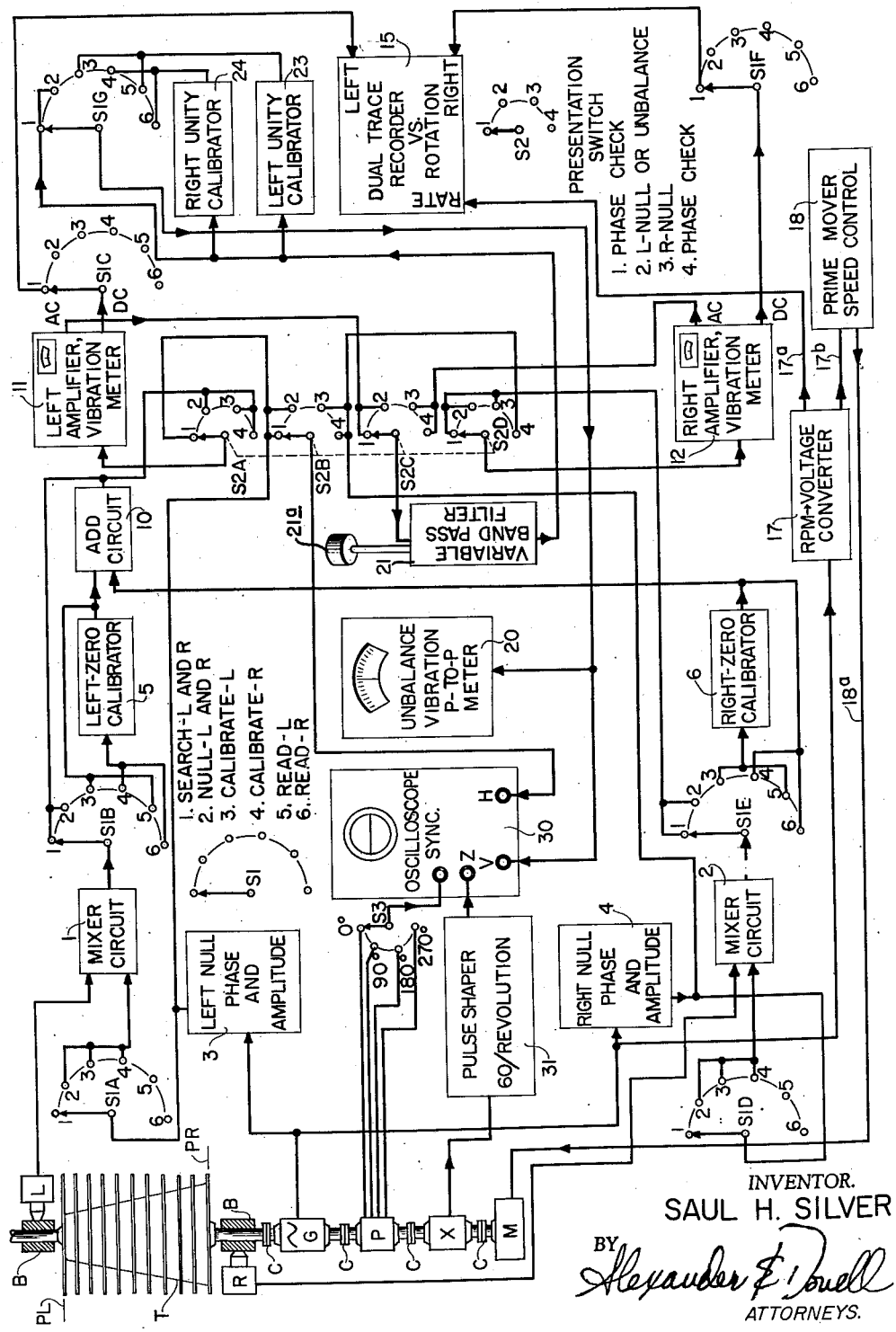

This invention relates to dynamic rotor balancing systems for determining the amplitude and angular position of rotor unbalances, the present system being especially adapted for use in balancing large high speed rotors.

The present system is particularly concerned with the balancing of rotors of such size and weight that they exhibit a certain degree of flexibility when rotated at high speed. The basic approach to the problem of balancing such rotors is similar to that disclosed in expired Patent #2,165,024 in which weight is added or subtracted in two arbitrarily selected planes disposed transversely of the rotor near its ends for the purpose of dynamically balancing the rotor. The present system is also similar to the approach disclosed in the above mentioned expired patent in that part of the present procedure for calibrating the circuits measuring the amplitude of unbalance is disclosed therein.

In the present system, the test piece, or rotor, is mounted in a flexure support including right and left bearings which are free to vibrate in a plane including the axis of the rotor, the latter being rotated by a prime mover the speed of which can be conveniently controlled. Right and left vibration pickups are employed adjacent the ends of the rotor and these pickups feed into separate right and left channels of the system. According to the two-plane rotor balancing approach, these two channels must be calibrated in such a way that unbalances in one plane will be read as the correct number of units of unbalance in the channel associated with the vibration pickup nearest that plane, but will provide zero readings in the other channel. This calibrating procedure includes the steps of first nulling out the actual unbalances of the rotor, and then adding a unit unbalance to the rotor, first in one plane and then in the other plane, while adjusting attenuators in both channels to provide the necessary calibrations thereof. This much of the present system is basically old and well known in the prior art, and it is this prior art to which the present system adds improvements intended to increase the accuracy of the measurements of amplitude and unbalance position.

It is a principal object of this invention to provide a system especially adapted to high speed balancing of rotors wherein the phase shifts inherent in the system are cancelled out at the particular rotation rate at which a balance is to be perfected, these phase shifts introducing serious errors if not eliminated.

Another important object of this invention is to provide a system including a multi-trace recorder by which a simultaneous record of unbalance in each channel as a function of r.p.m. can be obtained during a "search" conducted over the useful range of speeds of the rotor. This record of unbalance shows the speed or speeds of the rotor at which unbalance is greatest. Moreover, it shows whether or not corrective steps must be performed on a particular rotor, and if so, at what specific r.p.m., it being well known in the art that a true balance of a rotor which is not perfectly rigid can be perfected only at a single selected r.p.m.

Still another object of this invention is to combine accurate automatic speed control means with a dynamic balancing system of the present type wherein the balance must be perfected at a particular selected r.p.m.

It is another major object of this invention to provide in combination with an accurate unbalance amplitude measuring system, an accurate system for determining the positions of said unbalance with reference to the angular position of the shaft.

Another important object of this invention is to provide a position indicating means which presents a visual representation of the unbalance over a large arc of shaft rotation, i.e. 360° or less. In particular, means is provided for presenting a visual representation of unbalance in any one of four quadrants whereby the representation is expanded for clearer illustration.

A further object is to provide marker pulses on these visual representations, the intervals between pulses representing a certain number of degrees of shaft rotation, i.e. where 60 pulses per revolution are employed, the intervals between pulses each represents 6 degrees rotation.

Another object of this invention is to provide visual aid means employing Lissajous figures for determining when said actual unbalances have been precisely nulled out, and for determining when said inherent phase shifts in the channels have been cancelled out, the proper connections of the visual aid means for performing these functions being quickly and conveniently made by associated switching means.

Still another object of this invention is to provide a "Function Selector" switch having multiple positions for quickly and accurately selecting the various functions of the system including Search, System Calibrating, and Read functions.

Other objects and advantages of the present invention will become apparent during the following detailed discussion.

The drawing is a function diagram illustrating a system including instrumentation for indicating and recording the unbalance as a function of r.p.m., and including built-in system calibrating means, and rotor speed control means.

Referring now to the drawing, a test piece T, a turbine rotor, includes a shaft which is supported in a pair of bearings B, which bearings are suspended for transverse freedom of motion in a plane which also includes the axis of the rotor. A suitable rotor supporting structure is illustrated in co-pending patent application to Ehrsam et al., Serial No. 722,030 filed March 17, 1958, entitled "Spin-Test and Balancing Machine." The shaft of the rotor T is connected through shaft couplings C to a prime mover M, the speed of which can be controlled in a manner to be more fully explained hereinafter. The prime mover M also drives a sine wave generator G, a pip generator P, and a marker pulse generator X, the utility of these generators being further explained hereinafter. As the rotor T is rotated by the prime mover M, vibration caused by rotor unbalance is transmitted to the bearings B which vibrate in their respective flexible support means (not shown). Left and right vibration pickups L and R are respectively associated with the left and right bearings B, these vibration pickups being of conventional design, for instance being seismic-type velocity or displacement pickups. The left pickup L is connected to the mixer circuit 1, and the right pickup is connected with the mixer circuit 2. The switch S1 actually comprises seven sections ganged together and labeled S1A, S1B, S1C, S1D, S1E, S1F and S1G. These switches are all operated by a common control shaft (not shown) and are capable of selecting one of six different positions, which positions are so numbered on the drawing. The gang switch S1 will be hereinafter referred to as the "Function Switch," and it will be noted that the functions in each of the six positions of the switch are enumerated in a legend shown on the drawing, and will be more fully explained later in the specification.

The balancing system includes separate left and right channels, these channels beginning respectively with the left vibration pickup L and the right vibration pickup R. The left channel includes the switch S1A, a mixer circuit 1, the switch S1B, a left phase and amplitude null circuit 3, and a left zero-calibrator 5. This channel then feeds into an add circuit 10, which circuit in certain positions of the function switch S1 serves in common with both the left and right channels.

Similarly, the right channel begins at the right vibration pickup R and includes the switch S1D, a mixer circuit 2, the switch S1E, the right phase and amplitude null circuit 4, and the right zero-calibrator 6. The output of the right channel also feeds directly into the add circuit 10, which as stated above comprises a junction between the left and right channels.

The balancing system further includes a second switch S2 which comprises four ganged sections operated by a common shaft (not shown). These four sections include S2A, S2B, S2C, and S2D. This switch is employed to control the data presentation of the system and a legend appears on the drawing showing the four switch positions and stating the type of presentation selected in each. A more complete description of the presentation in the four positions of the switch S2 will be provided hereinafter.

In general, the output of the left channel, of the right channel, and/or the combined outputs of both channels from the add circuit 10 pass through the switch S2 and by selection of one of the four positions are routed to one or more of the following instruments. The output of the left channel can be routed by the presentation switch S2A to the left vibration meter 11, and similarly the output of the right channel can be routed by the presentation switch S2D to the right vibration meter 12. The switch S2A can also route the combined outputs of the left and right channels from the add circuit 10 to the left vibration meter 11, which vibration meter is employed both for the purpose of looking exclusively at the output of the left channel, and also for the purpose of looking at the combined outputs of the two channels when added together by the add circuit 10. The right vibration meter 12 is employed only for the purpose of looking at the output of the right channel, and is not operative when both channels are being added together to provide a composite presentation, as will be discussed hereinafter.

The left vibration meter 11 and the right vibration meter 12 each includes an electronic amplifier and an integrating circuit and each unit delivers two different types of output, an amplified A.C. output similar to the input, and a D.C. output which comprises a unidirectional voltage the level of which is proportional to the amplitude of the vibration signal introduced into the vibration meter.

A dual trace recorder 15 is provided in the system and this recorder plots on a moving recording medium as two separate functions, the D.C. output level from the left vibration meter 11 and the D.C. output level from the right vibration meter 12. Thus two different curves are recorded representing the instantaneous amplitudes of vibration in each channel and the rate at which the recording medium is advanced during recording being a function of the r.p.m. of the rotor as determined by the rotation rate of the prime mover M. The sine wave generator G is connected with a converter 17 which receives the sine wave from the generator G, one cycle per revolution of the rotor shaft, and delivers two separate unidirectional voltages each of which is proportional to the rotation rate of the main shaft. The output voltage along the lead 17a is delivered to the dual trace recorder and directly controls the rate of advance of the recording medium therein. The output voltage on the line 17b from the converter 17 is delivered to a prime mover speed control 18. This speed control is a commercially available unit which includes an input circuit for receiving a control voltage which is proportional to the r.p.m. of a prime mover. The speed control 18 includes a reference voltage which can be preset for whatever rate of rotation is desired, and the speed control 18 then compares the incoming voltage from the lead 17b with the preset reference voltage and in turn delivers via the lead 18a differential correction signals which directly control the rate of rotation of the prime mover M. Actually, in the system presently being manufactured, the prime mover M comprises a steam turbine, and the control means within the speed control 18 comprises a plurality of valves which control the direction and rate at which steam is delivered to the turibne. In the commercially available speed control unit being used, there is also a strip recorder (not shown) which is advanced by a clock and plots actual r.p.m. of the prime mover versus time.

In addition to the presentation on the left vibration meter 11 and on the right vibration meter 12 of the amplitudes of vibration present in the respective left and right channels, an additional vibration indication is provided on a peak-to-peak voltmeter 20. The scale on the dial of this voltmeter is calibrated in terms of units of unbalance. The input to the vibration meter 20 comes through the switch S1G which derives output from the left vibration meter 11, this output passing through a variable band-pass filter 21 and also passing through a left unity-calibrator 23, or alternatively through a right unity-calibrator 24, depending on the particular position of the switch S1G. The purpose and function of these units 21, 23 and 24 will be hereinafter explained more fully.

The switch S1C is connected to the D.C. output of the left vibration meter, and the switch S1F is connected to the D.C. output of the right vibration meter 12, and these switches connect these outputs of the vibration meters to the associated input channels of the dual trace recorder, but only in position one of the switch S1. This is the Search position of the switch S1 in which the rotor T is accelerated through its entire range of rotation rates while a record of vibration amplitudes as a function of r.p.m. is recorded so that the overall picture of the vibrations at various speeds of the rotor T can be seen on a single composite record.

An oscilloscope 30 is also provided in connection with the present balancing system, and this oscilloscope serves several important purposes. In the first place it is employed as a phase distortion indicator, and during calibration of the balancing system indications on this oscilloscope in the form of Lissajous figures are displayed as an indication to aid in setting the phase distortion to zero in the overall balancing circuits. Secondly, the oscilloscope is employed as a visual aid during calibration and nulling. The third and most important use of the oscilloscope is to provide a visual presentation of the amplitude of unbalance versus the angular position of the rotor.

This angular position indication is derived from the outputs of the pip generator P and of the marker pulse generator X and associated circuits. The pip generator P comprises a rotary generator having four outputs. The particular details of this pip generator are not important to the functioning of the present balancing system, and therefore it is only necessary to state that each of the output leads provides a narrow triggering pulse. One lead provides this pulse at 0°; the next lead provides a triggering pulse at 90°; the third lead provides the triggering pulse at 180°; and the last lead provides the triggering pulse at 270°, the above angles all relating to the angular position of the shaft.

The oscilloscope 30 includes an internal linear sweep generator of the conventional and well-known type, and one of the above mentioned trigger pulses is selected by the switch S3 and is fed from the wiper of this switch to the external synchronizing terminal of the oscilloscope. It should therefore be apparent that by rotation of the switch S3, the position of the input trigger pulse can be moved to any one of four quadrature positions of the rotor T, and that when one of these positions for the trigger pulse has been selected the linear sweep of the oscilloscope will then be initiated at the corresponding angular position of the rotor. The linear sweep of the oscilloscope is adjustable and can be made to show 360° of rotation or to show a smaller arc such as 90° of rotation of the rotor. When the sweep is of duration sufficient to show only a 90° arc, by rotating the switch S3 to one of the four positions the amount of unbalance can be seen for any quadrant of rotation of the rotor T, the amplitude of vibration being displayed by deflection in a direction at right angles to the sweep direction and proportional to the input to the vertical amplifier of the oscilloscope at V.

It is very desirable to have additional marker pulses displayed on the trace of the oscilloscope, and for this purpose the marker pulse generator X is employed, this generator delivering 60 cycles of A.C. voltage for each revolution of the rotor shaft. The output of the marker pulse generator is delivered to a pulse shaper circuit 31, and this circuit supplies an output of 60 spikes per revolution of the rotor T. These spikes are applied to the intensity grid circuit Z of the oscilloscope so that 15 spikes are presented on the linear sweep of the oscilloscope for each 90° of shaft rotation, these spikes appearing as tiny spots of increased brightness on the oscilloscope trace, which spots are spaced exactly 6° apart with respect to the position of the rotor. Thus, the trace of the oscilloscope displays 90° of shaft rotation with marker spots at every 6°.

CALIBRATION AND OPERATION

As stated above, the function switch S1 has six positions, each of these positions selecting particular functions of the system, as follows:

*S1-Position One—Search.*—When a new rotor T is mounted in the bearings B, the first step is to rotate it at speeds extending over the entire r.p.m. range of the rotor, and to record the amount of vibration simultaneously appearing in the left and the right pickups, L and R respectively. In performing this function the switch S1 is set on Position One, the position of the switch shown in the drawing, wherein the output of the left vibration pickup L passes through the mixer circuit 1, the switch S1B, and to terminals of the switch S2A. This latter switch should be set in either Position Two or Position Three at this time. From the wiper of switch S2A the output of the left vibration pickup L passes through the left vibration meter 11 and appears as the aforementioned unidirectional (D.C.) voltage output, which output passes through the switch S1C into the left channel of the dual-trace recorder 15 where it is recorded on a medium advancing at a rate which is a function of the rotation rate of the rotor T. Likewise, the output from the right vibration pickup R passes through the mixer circuit 2, the switch S1E, and to the switch S2D. From the wiper of this latter switch the output then passes to the right vibration meter 12 which provides a unidirectional (D.C.) output through the switch S1F to the right channel of the dual trace recorder 15. These two signals are recorded side by side on the recording medium (not shown) at a rate of advance which is controlled by a control voltage via the lead 17a from the converter 17. The latter receives an input from the sine wave generator G the frequency of which is fixed by the rotation rate of the generator G and the rotor T. The converter 17 converts the sine wave input to a suitable output control voltage which controls the rate of advance of the strip in the two-channel recorder 15. A converter circuit capable of providing an output control voltage suitable for this purpose is shown connected to a meter in copending patent application to Burklund et al. Serial No. 718,174 filed February 28, 1958 now abandoned. The recorder 15 is a commercially available product of well-known type.

*S1-Position Two—Null.*—For calibrating the circuits of the present system a perfect test piece T is not available, and yet calibration is necessary so that the circuits will give proper responses during testing. For this purpose, an approach is used which is rather similar to that disclosed in expired Patent #2,165,024 as stated above. In this patent, since a perfect test piece is not available, it is suggested that the presence of a perfect test piece can be simulated by introducing into the left and right channels two separate nulling voltages which are equal and opposite in both amplitude and phase to the actual unbalance voltage appearing at the respective vibration pickups. In practice, the voltage appearing at either pickup as a reult of unbalance of the rotor is substantially sinusoidal, and therefore the nulling voltages should also be sinusoidal. For this purpose, in the present disclosure the sine wave generator G is connected to deliver a sinusoidal input voltage to the left phase and amplitude null circuit 3 and to the right phase and amplitude null circuit 4. The left null circuit 3 alters both the phase and the amplitude of the sinusoidal output of the generator G, the range of adjustment being adequate for the purpose of exactly nulling out the unbalance voltage from the left vibration pickup L. The right phase and amplitude null circuit likewise provides an output into the right channel the phase and amplitude of which may be adjusted to exactly cancel out the unbalance voltage from the right vibration pickup R. With the switch S1 in Position Two and the output of the left vibration pickup L directed in to the left mixer circuit 1 and the output of the right vibration pickup R inserted in the right mixer circuit 2, the output of the left phase and amplitude null circuit 3 is inserted in the mixer circuit 1 and similarly the output of the right null circuit 4 is inserted in the mixer circuit 2. In these mixer circuits the nulling voltages which are the outputs of the respective nulling circuits 3 and 4 are added to the output voltages of the associated vibration pickups L and R. The output of the left mixer circuit 1 passes through the switch S1B and to the switch S2A, and the output of the mixer circuit 2 passes through the swtich S1E to the switch S2D. The wiper of the switch S2A is connected to the left vibration meter 11, and the wiper of the switch S2D is connected to the right vibration meter 12. The left phase and amplitude null circuit 3 is then adjusted until the left vibration meter reads zero. Similarly, the right phase and amplitude null circuit 4 is adjusted until the right vibration meter 12 reads zero. At this time the actual unbalance of the rotor T is nulled out of both the left and right channels, and therefore as far as the balancing system itself is concerned, the rotor T appears to be a perfect test piece having zero unbalance.

Actually, the adjusting of the null circuits 3 and 4 is not so easily accomplished on a practical basis. Therefore, the assistance of the oscilloscope 30 is enlisted especially for the purpose of determining the point at which the phases of the nulling voltages are exactly correct. When adjustment of the left null circuit is to be made, the switch S2 is moved to position Two. In this position, the horizontal input H to the oscilloscope 30 is connected through the switch S2B to the output of the left phase and amplitude null circuit 3. The vertical input V to the oscilloscope 30 is connected from switch S1G to the variable band-pass filter 21 and through the switch S2C to the A.C. output of the left vibration meter 11. The linear sweep in the oscilloscope 30 is at this time unused and the inputs to the vertical and horizontal terminals of the oscilloscope are connected directly to the deflection system so that a Lissajous figure appears on the screen of the oscilloscope. The phase control in the left null circuit 3 is then adjusted until an inclined perfect straight line appears on the oscilloscope, which Lissajous figure indicates that the phase of the left nulling circuit 3 is exactly 180° reversed wtih respect to the phase of the output of the left vibration pickup L. The switch S2 is then rotated to position Three and the process is repeated by tuning the nulling circuit 4 for the right channel. When the switch S2 is in Position Three, the horizontal input H to the oscilloscope 30 is connected to the output of the right phase and amplitude null circuit 4 through the switch S2B. Also at this time, the vertical input V to the oscilloscope 30 is connected through the switch S1G to the variable band-pass filter which is connected to the switch S2C to the A.C. output of the right vibration meter 12. These A.C. outputs are merely amplified versions of the sine wave input to the vibration meters.

When nulling out the vibration signals from the left or right vibration pickups, a phase error can be introduced into the Lissajous figures appearing on the oscilloscope 30 because of the fact that the amplifier in the vibration meter 11 and the variable band-pass filter 21 are included in the circuit between the vibration pickup and the vertical input V to the oscilloscope 30, whereas no corresponding vibration meter and variable band-pass filter appear in the horizontal input H to the oscilloscope 30 from the associated phase and amplitude null circuit. It is therefore essential that the band-pass filter 21 and the amplifier in the vibration meter 11 impart zero-phase shift to the signal passing therethrough. The variable band-pass filter 21 is introduced in the circuit during the nulling procedure because of the fact that the outputs of the vibration pickups include not only a sine wave of fundamental frequency as determined by the rotation rate of the rotor T, but also include undesirable harmonics, sub harmonics, and general noise and rumble attributable to the bearings, etc. Therefore, the variable band-pass filter is inserted so as to pass the fundamental sine wave which indicates the amplitude and phase of the unbalance, and to reject the extraneous noise and harmonic components which would otherwise tend to confuse the nulling procedure. The band-pass filter actually causes some attenuation of the output signal of the vibration pickups, and this is the reason why it is necessary to pass the signal through the amplifier in the vibration meter 11 to compensate for losses in the variable band-pass filter 21. The series combination of the left vibration meter 11 and the band-pass filter 21 actually introduces a composite phase shift which can be adjusted to zero by varying the tuning of the band-pass filter 21 as is schematically illustrated in the drawing by turning the knob 21a. A device suitable for this purpose can be purchased from The General Radio Co., Model 1232 A. In other words, by tuning the filter 21 slightly off resonance in one direction a lagging phase shift can be introduced, and alternatively by tuning the filter 21 slightly off resonance in the opposite direction a leading phase shift can be introduced. Thus, by proper adjustment of the direction and amount of phase shift introduced by the filter 21, the phase shift attributable to the amplifier in the vibration meter 11 can be exactly cancelled out. Cancelling out of this composite phase shift is performed in the following manner: The switch S2 must be set in position one wherein the horizontal input H to the oscilloscope 30 is connected through the switches S2B and S2A to the input to the left vibration meter 11. At the same time, the vertical input V to the oscilloscope 30 is connected through the switch S1G to the output of the variable band-pass filter 21. Thus, a Lissajous figure will appear on the oscilloscope which represents the composite phase shift through the left vibration meter 11 and the variable band-pass filter 21. Thus, the filter 21 may be tuned until an inclined straight line appears on the screen of the oscilloscope but disposed in the opposite direction with respect to the line previously mentioned, which line represented an 180° phase shift.

After the phase shift is set to zero in Position One of switch S2, the switch is then moved to Position Two at which time a Lissajous figure appears on the screen by which the left phase and amplitude null circuit 3 can be set to exactly balance out the phase and amplitude of the output of the left vibration pickup.

With respect to the right channel the procedure is exactly the same except that the variable band-pass filter 21 is connected in series with the amplifier in the right vibration meter 12, and the switch S2 is first set in Position Four so that the band-pass filter may be adjusted by turning the schematically illustrated knob 21a to tune out the composite phase shift of the filter 21 and the amplifier in the right vibration meter amplifier 12. When this composite phase shift has been set at zero, the switch S2 is then moved to Position Three, at which time the output of the right vibration pickup R is compared with the output of the right phase and amplitude null circuit 4 on the screen of the oscilloscope so that an exact 180° phase opposition of these two signals can be indicated by means of a Lissajous figure on the screen of the oscilloscope 30. Once the left phase and amplitude null circuit 3 and right phase and amplitude null circuit 4 have been adjusted with the switch S1 in Position Two-Null, the system can be calibrated in the following manner:

*S1-Position Three—Calibrate Left.*—In this position, two calibrations must be made for each channel. The actual vibrations which comprise the output of the left vibration pickup L and of the right vibration pickup R are still nulled out by the settings of the left and right nulling circuits as described above in connection with Position Two of the function switch S1. However, the vibration meter calibrators have to be set in order to calibrate the circuits so that they can be used to measure actual amplitude of unbalance. In Position Three, the output of the mixer circuit 1 in the left channel is passed to the add circuit 10 and the output of the mixer circuit 2 is connected to the right zero-calibrator 6 which in turn sends its signal to the add circuit 10. Because of the nulling effect which simulates a perfect rotor, the left vibration meter 11 should read zero. As stated above, the present balancing system employs the well-known method of balancing the rotor in which two arbitrary planes are selected, one near the right end of the rotor and one near the left end of the rotor, and balance is effected by adding or subtracting weight in the right plane PR and in the left plane PL, shown in the drawing. Thus, with switch S1B in Position Three, the test piece T is stopped, and a unit unbalance weight is added in the right plane PR. The rotor is then brought back up to the particular speed at which balance is to be effected, and the right zero-calibrator 6, which is an attenuator, is adjusted until the left vibration meter 11 and the peak-to-peak meter 20 read zero. In other words, by so adjusting the right zero-calibrator 6, the unbalancing effect of the weight added in the right plane, as viewed at the left plane, is made equal to zero. The rotor is then stopped, and the unit unbalance is moved from the right plane PR to the left plane PL, and with the function switch S1 still in Position Three, the left unity-calibrator 23 is adjusted until the total vibration indicated on the peak-to-peak voltmeter 20 is equal to unity. While these adjustments are being made, the A.C. output of the left vibration meter 11 is passed through switch S2C which should be in position two, through the variable band-pass filter 21 and through the left unity-calibrator 23 (which is an attenuator) to Position Three of switch S1G. It should be noted that switch S2 is always set in Position Two whenever the function switch S1 is set in Positions Three, Four, Five or Six. The output from the wiper of switch S1G then travels to the vertical input V of the oscilloscope and also to the total vibration meter 20.

*S1-Position Four—Calibrate-Right.*—It then becomes necessary to calibrate the right channel in a similar manner. The switch S1 is advanced to Position Four and the switch S2 is placed in Position Two. With the switches so positioned, and with the unit unbalance still located on the left plane PL of the rotor T, the left zero-calibrator 5 is then adjusted until the reading at the left vibration meter 11 becomes zero. Thus, the channels are calibrated so that an unbalance appearing at the left plane PL of the rotor T has no effect on readings in the right channel. The rotor is then stopped, and the unit unbalance is removed from the left plane PL and attached again in the right plane PR. The rotor T is then brought back up to speed and the right unity-calibrator 24 is adjusted until the total vibration as read on the vibration meter 20 is unity. At this time, the vibration meter 20 and the vertical input V to the oscilloscope 30 are connected through the switch S1G in Position Four through the right unity-calibrator (which is an attenuator) to the output of the variable band-pass filter 21 which is connected through the switch S2C in Position Two to the A.C. output of the left vibration meter 11. Notice that all readings made in Positions Three, Four, Five, and Six of the function switch S1, and in Positions Two, Three, and Four of the presentation switch S2 are made through the left vibration meter 11 since only a single add circuit 10 is provided, there being no add circuit in the right channel.

The system has now been calibrated so that an unbalance appearing in the left plane PL of the rotor T has no effect on the right channel but so that a unit unbalance in the right plane PR of the rotor T produces a reading of unity on the vibration meter 20. At this time, the test piece T is again stopped and the added unit unbalance is removed. The balancing system has now been calibrated, and is ready for use.

*S1-Position Five—Read Left.*—In this position, the output of the left vibration pickup L passes through the mixer circuit 1 and through the switch S1B and directly into the add circuit 10. The output of the right vibration pickup R passes through the mixer circuit 2, through the switch S1E and into the right zero-calibrator 6 the output of which is also connected into the add circuit 10. It will thus be seen that the output of the add circuit 10 will be the sum of the output of the left vibration pickup L and the right vibration pickup R, the latter being multiplied by a constant inserted by the right zero-calibrator 6. The function performed by the add circuit 10 is actually one of subtraction. The output of the add circuit is then conducted to switch S2A which is in position two at which time the output passes through this switch and into the left vibration meter 11. The output of the left vibration meter goes through switch S2C and into the variable band-pass filter 21. From the output of this filter the signal goes through the left unity calibrator 23, through the switch S1G and finally to the peak-to-peak vibration meter 20 which has been calibrated as previously described to indicate the amplitude of unbalance in terms of units of unbalance in the left plane PL. The indication of vibration not only shows up on the vibration meter 20, but also is applied to the vertical input V to the oscilloscope 30. At this time, the oscilloscope is operated using its internally generated linear sweep which is equal in length to 90° of rotation of the test piece T. The switch S3 may be switched to the 0°, 90°, 180°, or 270° position, and by rotation of this switch the operator can trigger the sweep of the oscilloscope to begin at any one of these four angular positions of the rotor T.

The output of the marker pulse generator X is fed into the pulse shaper 31 and the output thereof is 60 spikes per revolution of the shaft. Since only a quarter of a revolution of the shaft is displayed at this time on the sweep of the oscilloscope, the application of these pulses to the intensity grid circuit Z of the oscilloscope produces 15 marker pulses on the sweep, these 15 pulses being spaced 6° apart with respect to the angular position of the rotor T. It is to be understood, however, that the duration of the oscilloscope sweep is not limited to 90° but can be readjusted to provide a sweep length equivalent to one-half or to one complete revolution of the test piece, as desired. When the switch S3 has been rotated through its four positions, the display on the oscilloscope will have indicated where the unbalance is greatest, where it is least and which of the maxima is plus and which is minus. For instance, if the unbalance is maximum at 100°, the position of the switch S3, set at 90°, will provide an amplitude maximum occurring a little less than two marker pulses to the right of the beginning of the sweep on the oscilloscope. In this way, the exact position of the unbalance may be determined with good accuracy, and the amplitude of unbalance can be seen either on the screen of the oscilloscope or on the reading of the peak-to-peak vibration meter 20, calibrated in terms of units of unbalance.

*S1-Position Six—Read Right.*—Once the position and amplitude of unbalance in the left plane has been determined, the function switch S1 may be moved to Position Six and the procedure then repeated. The output of the right vibration pickup R passes through the mixer circuit 2, through the switch S1E, and into the add circuit 10. The output of the left pickup L passes through the mixer circuit 1 and through the switch S1B and into the left zero-calibrator 5 the output of which is then fed into the add circuit 10. The switch S2 is set on position two and the output of the add circuit 10 passes through switch S2A and is fed into the left vibration meter 11. It is amplified in this unit and passes through the switch S2C and through the variable band-pass filter 21 into the right unity calibrator 24, and thence through the switch S1G and into the peak-to-peak vibration meter 20. This indication of amplitude is also applied to the oscilloscope at its vertical input V and the oscilloscope pip generator P and marker pulse generator X and associated circuits including the switch S3 are then employed to determine the angle of maximum unbalance of the test piece T with reference to the right plane PR.

Once the determinations have been made of the amplitude and the angle of unbalance for both the left and right planes, the rotor is then stopped and material is cut away or weight added at a position and in a quantity calculated to compensate for the indicated unbalances. The rotor may then be brought back up to speed and new readings taken with respect to the left plane in Position Five of the function switch and with respect to the right plane in Position Six of the function switch S1. If the unbalance is still greater than that which may be tolerated, the rotor is again stopped and additional adjustments made in its weight distribution.

This invention is not to be limited to the exact form shown in the drawing, for changes and substitutions may be made therein within the scope of the following claims.

I claim:

1. In a system for determining the amplitudes and angular positions of unbalance of a rotor driven by a prime mover with reference to two selected planes disposed normal to the axis of rotation of the rotor and the system including vibration pickups at each plane connected respectively with separate electrical signal channels of the system and including means for cancelling in the channel associated with each plane the effect of unbalances in the other plane, the combination therewith for determining said unbalances with improved accuracy of means comprising, speed control means for maintaining the rotation of the prime mover at a preselected rate; amplifier means coupled with tunable band-pass filter means and connected to selectively receive the signals from one of said channels, and said filter means including tuning means adjustable to pass the fundamental frequency at said predetermined rotation rate; rotor angular position marker means; an oscilloscope having a sweep generator; and multiple-position selector means coupled with said amplifier and filter means and with said oscilloscope for displaying on the latter in one position of the selector means the output versus the input of the amplifier means coupled with the filter means to indicate during adjustment of the filter tuning means a condition of zero composite phase-shift therethrough at said predetermined rotation rate, and in another position of the selector means to display said signals from the selected channel as an indication of unbalance amplitude versus the sweep of the oscilloscope synchronized to said rotation rate by said marker means.

2. In a system as set forth in claim 1, at least two markers being generated per revolution of the rotor and a trigger switch between said marker means and said oscilloscope for selecting which marker initiates the sweep.

3. In a system as set forth in claim 1, a converter coupled to the prime mover and receiving a wave having a frequency directly related to the rotation rate of the rotor, and said converter delivering a control voltage proportional to said rate; a dual trace recorder connected to said selector means to be connected thereby in still another position to said channels for recording separately on a recording medium the simultaneous outputs of the vibration pickups, the rate of advance of the recording medium being determined by the magnitude of said control voltage and the speed of the prime mover, and means for varying the speed of the prime mover over the speed range of the rotor during recording of the amplitudes of unbalance as a function of rotation rate.

4. In a system as set forth in claim 1, pulse generator means driven by said prime mover and delivering a predetermined number N of pulses per revolution of the rotor, said pulses representing angles of $$\frac{360}{N}$$

degrees of rotation, and pulse shaper means connected to said pulse generator means and delivering to the oscilloscope a sharp spike for each generated pulse to provide discrete markers on the sweep trace.

5. In a system as set forth in claim 1, a generator coupled to the rotor and delivering a wave proportional to the rotation rate of the rotor; a converter coupled to the generator and delivering a control voltage proportional to said wave, and said speed control means being coupled to said converter to receive said control voltage and including a source of preset reference voltage and including means for determining the differential between said voltages; and means coupled to said speed control means for controlling the prime mover speed according to said differential.

6. In a system for determining the amplitudes and angular positions of unbalance of a rotor driven by a prime mover with reference to two selected planes disposed normal to the axis of rotation of the rotor and the system including vibration pickups at each plane connected respectively with separate electrical signal channels of the system, the combination therewith for determining said unbalances with improved accuracy of means comprising, speed control means for maintaining the rotation of the prime mover at a preselected rate; amplifier means coupled with tunable band-pass filter means and connected to selectively receive the signals from one of said channels, and said filter means including tuning means adjustable to pass the fundamental frequency at said predetermined rotation rate; means for generating a plurality of pips fixed in relation to angular displacements of the rotor; an oscilloscope having a sweep generator; and multiple-position selector means coupled with said amplifier and filter means and with said oscilloscope for displaying on the latter in one position of the selector means the output versus the input of the amplifier means coupled with the filter means to indicate during adjustment of the filter tuning means a condition of zero composite phase-shift therethrough at said predetermined rotation rate, and in another position of the selector means to display said signals from the selected channel as an indication of unbalance amplitude versus the sweep of the oscilloscope, said oscilloscope being coupled to said generating means and displaying on said sweep said plurality of pips.

7. In a system as set forth in claim 6, a converter coupled to the prime mover and receiving a wave having a frequency directly related to the rotation rate of the rotor, and said converter delivering a control voltage proportional to said rate; a dual trace recorder connected to said selector means to be connected thereby in still another position to said channels for recording separately on a recording medium the simultaneous outputs of the vibration pickups, the rate of advance of the recording medium being determined by the magnitude of said control voltage and the speed of the prime mover, and means for varying the speed of the prime mover over the speed range of the rotor during recording of the amplitudes of unbalance as a function of rotation rate.

8. In a system as set forth in claim 6, indicating means including a peak-to-peak voltmeter connected with said oscilloscope and calibrated in terms of units of unbalanced amplitude.

9. In a system for determining the amplitudes and angular positions of unbalance of a rotor driven by a prime mover with reference to two selected planes disposed normal to the axis of rotation of the rotor and the system including vibration pickups at each plane connected respectively with separate electrical signal channels of the system, the combination therewith for determining said unbalances with improved accuracy of means comprising, automatic speed control means for maintaining the rotation rate of the prime mover at a preselected rate; amplifier means coupled with tunable band-pass filter means and connected to selectively receive the signals from one of said channels, and said filter means including tuning means adjustable to pass the fundamental frequency at said predetermined rotation rate; an oscilloscope; and multiple-position selector means coupled with said amplifier and filter and with said oscilloscope for displaying on the latter in one position of the selector means the output versus the input of the amplifier means coupled with the filter means to indicate during adjustment of the filter tuning means a condition of zero composite phase-shift therethrough at said predetermined rotation rate, and in another position of the selector means to display said signals from the selected channel as an indication of unbalance amplitude.

10. In a system as set forth in claim 9, a generator coupled to the rotor and delivering a wave proportional to the rotation rate of the rotor; a converter coupled to the generator and delivering a control voltage proportional to said wave, and said speed control means being coupled to said converter to receive said control voltage and including a source of preset reference voltage and including means for determining the differential between said voltages; and means coupled to said speed control means for controlling the prime mover speed according to said differential.

References Cited in the file of this patent

UNITED STATES PATENTS

| | | |
|---|---|---|
| 2,243,379 | Johnson | May 27, 1941 |
| 2,243,457 | Esval et al. | May 27, 1941 |
| 2,303,424 | Bendz | Dec. 1, 1942 |
| 2,315,578 | Baker | Apr. 6, 1943 |

(Other references on following page)

UNITED STATES PATENTS

| | | |
|---|---|---|
| 2,338,293 | Martin | Jan. 4, 1944 |
| 2,344,753 | Van Degrift | Mar. 21, 1944 |
| 2,346,975 | Laboulais | Apr. 18, 1944 |
| 2,394,411 | Tolman | Feb. 5, 1946 |
| 2,449,563 | Minorsky | Sept. 21, 1948 |
| 2,663,184 | Merrill et al. | Dec. 22, 1953 |
| 2,748,603 | Wilcox | June 5, 1956 |
| 2,851,885 | Federn et al. | Sept. 16, 1958 |
| 2,892,152 | Buisson | June 23, 1959 |
| 2,924,977 | Kenyon et al. | Feb. 16, 1960 |
| 2,975,640 | Quell | Mar. 21, 1961 |
| 2,983,148 | White | May 9, 1961 |

FOREIGN PATENTS

| | | |
|---|---|---|
| 888,464 | Germany | Sept. 3, 1953 |
| 760,678 | Great Britain | Nov. 7, 1956 |
| 784,768 | Great Britain | Oct. 16, 1957 |

OTHER REFERENCES

Pages 644 and 645 and FIG. 15 between these pages—Harris, a text book titled "Electrical Measurements," published by Wiley & Sons in 1952.